US012568150B1

(12) United States Patent
Kumar Shukla et al.

(10) Patent No.: US 12,568,150 B1
(45) Date of Patent: Mar. 3, 2026

(54) METHODS FOR OPTIMIZING NFPROFILE DISCOVERY AND SUBSCRIPTIONS

(71) Applicant: F5, Inc., Seattle, WA (US)

(72) Inventors: Gautam Kumar Shukla, Bangalore (IN); Mohammad Asif, Mughalsarai (IN); Sandeep Dasgupta, Bangalore (IN)

(73) Assignee: F5, Inc., Seattle, WA (US)

( * ) Notice: Subject to any disclaimer, the term of this patent is extended or adjusted under 35 U.S.C. 154(b) by 0 days.

(21) Appl. No.: 18/400,314

(22) Filed: Dec. 29, 2023

(51) Int. Cl.
*H04L 67/51* (2022.01)
*H04L 41/0803* (2022.01)
*H04L 67/568* (2022.01)

(52) U.S. Cl.
CPC .......... *H04L 67/51* (2022.05); *H04L 41/0803* (2013.01); *H04L 67/568* (2022.05)

(58) Field of Classification Search
CPC .... H04L 67/51; H04L 41/0803; H04L 67/568
See application file for complete search history.

(56) References Cited

U.S. PATENT DOCUMENTS

| | | | | |
|---|---|---|---|---|
| 2020/0374197 | A1* | 11/2020 | Vysotsky | H04L 41/0843 |
| 2021/0037114 | A1* | 2/2021 | Nikain | H04L 67/34 |
| 2021/0258864 | A1* | 8/2021 | Jeong | H04W 48/16 |
| 2022/0110082 | A1* | 4/2022 | Belling | G06F 21/6218 |
| 2022/0224776 | A1* | 7/2022 | Doshi | G06F 12/0897 |
| 2023/0090068 | A1* | 3/2023 | Rajput | H04L 61/5076 370/254 |
| 2023/0164109 | A1* | 5/2023 | Rajput | H04L 61/5076 709/245 |
| 2023/0262025 | A1* | 8/2023 | Krishan | H04L 61/5046 709/245 |
| 2024/0196193 | A1* | 6/2024 | Kuravangi-Thammaiah | H04W 8/20 |
| 2024/0275860 | A1* | 8/2024 | Trefcon | H04W 28/06 |

* cited by examiner

*Primary Examiner* — Tonia L Dollinger
*Assistant Examiner* — Mehulkumar J Shah
(74) *Attorney, Agent, or Firm* — Troutman Pepper Locke LLP

(57) ABSTRACT

Methods, non-transitory computer readable media, network traffic management devices and network traffic management systems that provide protection of core networks are illustrated. With this technology, the method includes configuring a service communication proxy among a plurality of service communication proxies to receive a request from a network function. In some examples, the network function is one of the plurality of network functions. Next, the service communication proxy can be configured to determine whether a profile of the network function is stored in a common cache and, in response to determining the profile is in the common cache, retrieve the profile to respond to the request. Then, service communication proxy can be configured to select a destination NF based on based on the stored profile of the network function retrieved from the common cache.

20 Claims, 8 Drawing Sheets

1

METHODS FOR OPTIMIZING NFPROFILE DISCOVERY AND SUBSCRIPTIONS

This technology relates to methods and systems for optimizing NFProfile discovery and subscription for multiple SCP instances across different clusters.

BACKGROUND

In a mobile core network, a network repository function (NRF) implements registration and discovery of various network services and a service communication proxy (SCP) supports traffic distribution across the mobile core network. In order to distribute traffic, the SCP must communicate with the NRF to register itself, discover all functions available in the network, and subscribe to be notified of changes in the network. In the core network, there can be multiple SCP instances communicating to the NRF. Every SCP instance has to register itself and can initiate service discovery and subscribe for updates with the NRF. The service discovery and subscription based notifications for each SCP instance takes a large amount of network bandwidth. The NRF can be overloaded which may increase the latency for critical signalling. Additionally, many times the notification and discovery completed by each SCP instance can be duplicative. As a result, a new method to optimize the discovery and subscription processes by multiple SCP instances is necessary.

SUMMARY

A method implemented by a network traffic management system that includes configuring a service communication proxy among a plurality of service communication proxies to receive a request from a network function. In some examples, the network function is one of the plurality of network functions. Next, the service communication proxy can be configured to determine whether a profile of the network function is stored in a common cache and, in response to determining the profile is in the common cache, retrieve the profile to respond to the request. Then, service communication proxy can be configured to select a destination NF based on based on the stored profile of the network function retrieved from the common cache.

A network traffic management device includes a memory including programmed instructions stored thereon and one or more processors configured to be capable of executing the stored programmed instructions to configure a service communication proxy among a plurality of service communication proxies to receive a request from a network function. In some examples, the network function is one of the plurality of network functions. Next, the service communication proxy can be configured to determine whether a profile of the network function is stored in a common cache and in response to determining the profile is in the common cache, retrieve the profile to respond to the request. Then, service communication proxy can be configured to select a destination NF based on based on the stored profile of the network function retrieved from the common cache.

A non-transitory computer readable medium having stored thereon instructions for including executable code that, when executed by one or more processors, causes the processors to configure a service communication proxy among a plurality of service communication proxies to receive a request from a network function. In some examples, the network function is one of the plurality of network functions. Next, the service communication proxy can be configured to determine whether a profile of the network function is stored in a common cache and in response to determining the profile is in the common cache, retrieve the profile to respond to the request. Then, service communication proxy can be configured to select a destination NF based on based on the stored profile of the network function retrieved from the common cache.

A network traffic management system with memory comprising programmed instructions stored thereon, and one or more processors configured to be capable of executing the stored programmed instructions to configure a service communication proxy among a plurality of service communication proxies to receive a request from a network function. In some examples, the network function is one of the plurality of network functions. Next, the service communication proxy can be configured to determine whether a profile of the network function is stored in a common cache and in response to determining the profile is in the common cache, retrieve the profile to respond to the request. Then, service communication proxy can be configured to select a destination NF based on based on the stored profile of the network function retrieved from the common cache.

This technology provides a number of advantages including providing methods, non-transitory computer readable media, network traffic management devices, and network traffic management systems that can reduce overload of the NRF, reduce the latency for critical signalling, and reduce the network bandwidth used by the SCP by designating one of the service communication proxies to act as a master to receive all notifications from the NRF, initiate discovery to receive any profiles for NFs, and store the profiles in a common cache for any service communication proxy to access. The remaining service communication proxies can then utilize the stored profiles from the common cache and do not have to receive notifications from the NRF. Thus, the discovery and subscription process can be optimized and made efficient.

DETAILED DESCRIPTION

An example of a network 10 (i.e., system architecture) with a network traffic manager apparatus 24 for optimizing NFProfile discovery and subscriptions is illustrated in FIGS. 1-8. The exemplary environment 10 includes a network traffic manager apparatus 24, a user equipment ("UE") 16, a user plane function ("UPF") 12, a control plane ("CP") 18, a data network ("DN") 20, and a next-generation node Bm ("gNodeB") 22 which are coupled together by point-to-point reference points, although the environment can include other types and numbers of systems, devices, components, and/or elements and in other topologies and deployments. The point-to-point reference points can be tunneled interfaces where traffic goes through the tunnels. While not shown, the exemplary environment 10 may include additional network components, such as functions, routers, switches, and other devices, which are well known to those of ordinary skill in the art and thus will not be described here.

Figure 1:
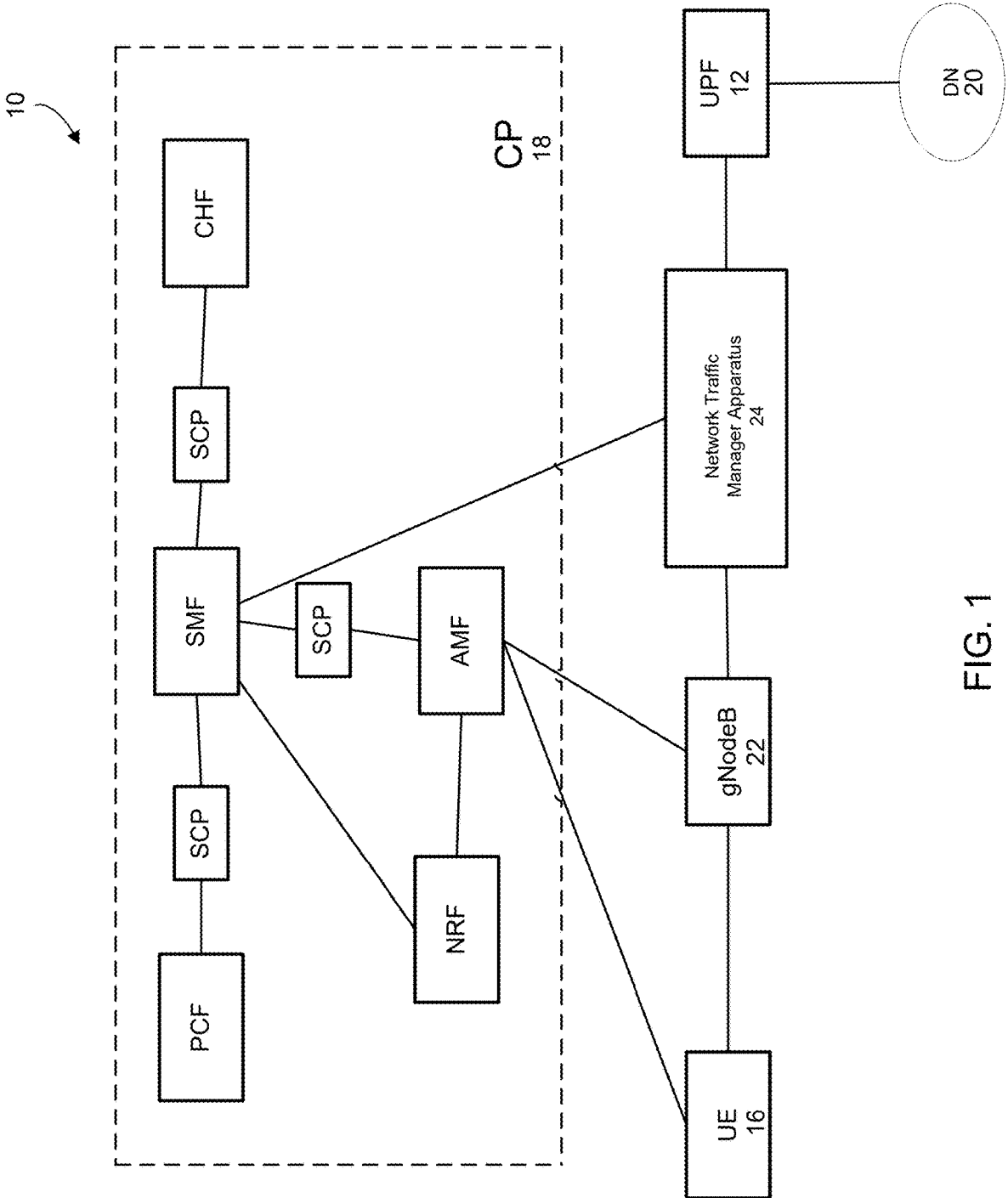
FIG. 1 is an block diagram of an exemplary system architecture with a network traffic manager apparatus.

Referring to FIG. 1, an exemplary representation of a network system architecture 10 is shown. As will be understood by those of ordinary skill in the art, the representation focuses on the interactions between pairs of network functions defined by point-to-point reference points between any two network functions (e.g., AMF and gNodeB 22) and is used when some interaction exists between any two network functions. As used herein, the term "network function" (NF) may refer to a component of a network infrastructure that provides a well-defined functional behavior (e.g., routing, switching, etc.). An NF may be a functional building block within a network infrastructure, which has well-defined external interfaces and a well-defined functional behavior. NFs may be a network node, a physical appliance or a software implementation of a previously physically implemented network functionality. As used herein, NF may refer to physical network functions (PNFs), virtualized network functions (VNFs), and/or to cloud-native network functions (CNFs). Although FIG. 1 only illustrates one instance of various network functions, as known in the art, additional instances of each network function can be included in the network system architecture 10.

Further, while the exemplary representation of a network system architecture 10 also includes point-to-point reference points between the NFs where necessary (e.g., see lower portion of FIG. 1), the upper portion of the figure, the Control Plane ("control plane") 18, has a bus and a service-based interface exhibited by individual function. This creates what is referred to as a Service Based Architecture (SBA), in which one CP network function (e.g., SMF) allows any other authorized NFs to access its services. Per the 3GPP standard, NFs within the control plane shall only use service-based interfaces for their instructions.

As illustrated in FIGS. 1-7, the network system architecture 10 for optimized NFProfile discovery and subscription can include: Access and Mobility Management function (AMF), Session Management function (SMF), and Network Repository function (NRF). As will be appreciated by those of ordinary skill in the art, all of these NFs are well-known and additional NFs not illustrated in FIG. 1 can be a part of the network system architecture 10. Nevertheless, a brief overview of some of the functionalities of each are provided herein for reference:

The AMF may support termination of NAS signaling, NAS ciphering and integrity protection, registration management, connection management, mobility management, access authentication and authorization and security context management.

The SMF may support session management (e.g., session establishment, modification and release), UE 16 IP address allocation and management, DHCP functions, termination of NAS signaling related to session management, DL data notification and traffic steering configuration for UPF 12 for proper traffic routing.

The NRF may support service discovery function and maintains NF profile and available NF and SCP instances.

Figure 3:
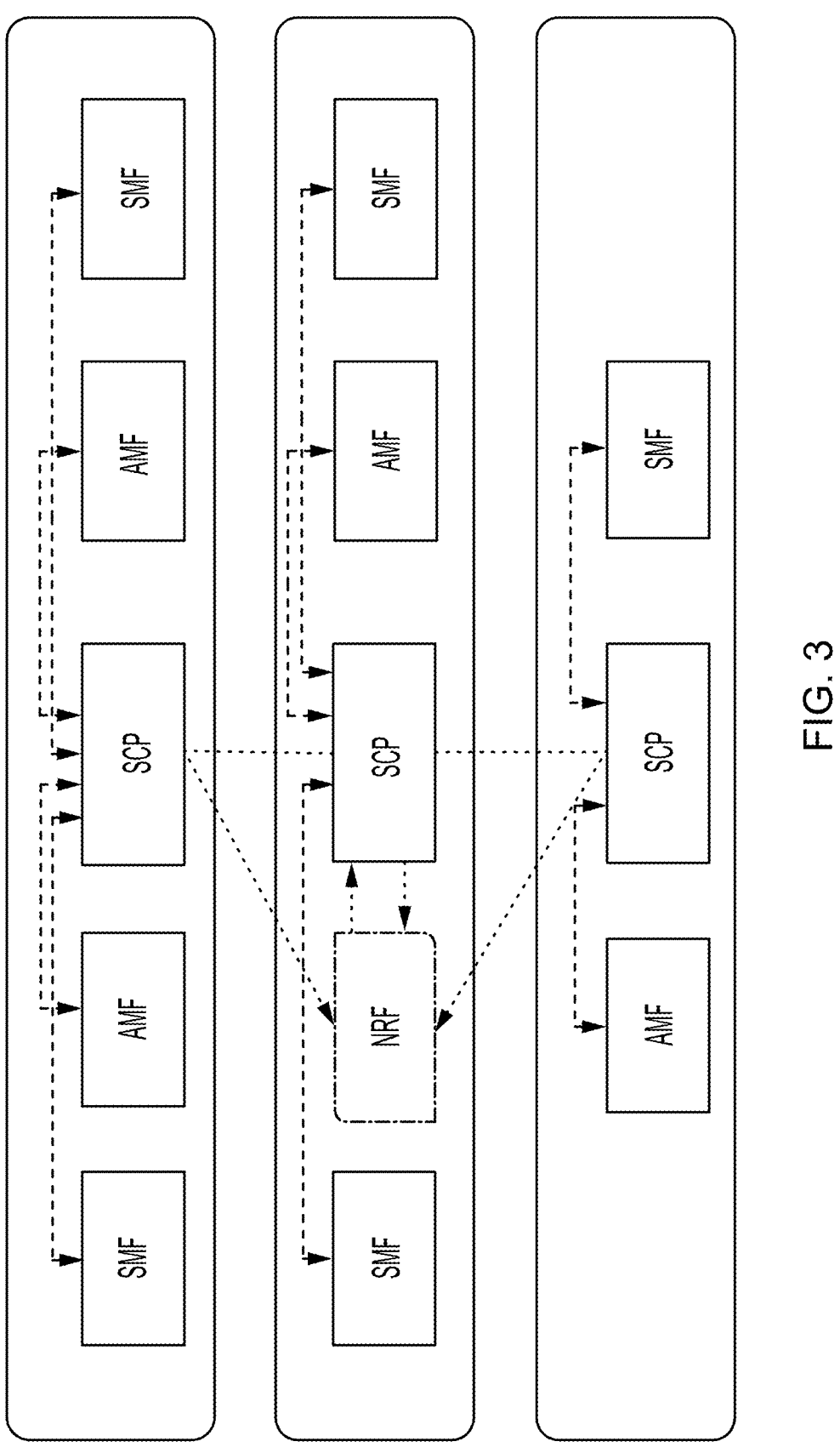
FIG. 3 is an illustration of an exemplary network cluster of SCP instances registering at an NRF.

An Service Communication Proxy (SCP) may support dynamic scaling and management of communication and services in the network system 10. An SCP can be placed between any network functions or NFs as illustrated in FIGS. 1 and 3. The SCP can be responsible to resolve network function (NF) discovery requests via communication with the NRF and can initiate domain name server (DNS) IP address lookups to a DNS server to locate live instances for available NFs. The SCP can receive a message from any NF for routing. SCPs can perform also perform registration (and de-registration), discovery, and subscription (subscribe-notify) functions by communicating with the NF. In this example, the SCP may have access to a common cache such as the memory 204 of the network traffic manager apparatus 24. The SCP may include multiple SCP instances that can communicate with each other and with the NRF and NFs.

As will be understood by those of ordinary skill in the art, as further depicted in FIG. 1, a user equipment (UE) 16 device (e.g., a smartphone) may access the network 10 by connecting to a Radio Access Network (R(AN)) or a gNodeB 22 (e.g., a cellular network), and may ultimately access an external data network (DN) 20 through a user plane function (UPF) 12. The network architecture also may include other network devices such as routers or switches, for example, which are known in the art and thus will not be described herein.

A "client," 16 "client device," 16 "user equipment" 16 and/or "user equipment device" 16 refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers. User equipment may be any device that is used directly by an end-user to communicate with a network and may include devices such as, for example, hand-held telephones, smartphones, laptop computers equipped with a mobile broadband adapter, or any other such device that is capable of connecting to a radio access network (RAN), Wi-Fi network, or any other such network. Although FIG. 1 only depicts a single UE 16 and singular NFs (e.g., AMF, SMF, etc.), it should be understood that it is contemplated that the system architecture may include many of each. For example, there may be many UEs 16 that communicate with the gNodeB 22.

A data network (DN) 22 or "server" (also referred to as a "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients. The user equipment (UE) may access the network of the control plane 18 by connecting to a Radio Access Network (R(AN)) or a gNodeB 22 (e.g., a cellular network), and may ultimately access an external data network (DN) 20.

A gNodeB 22 is a node in a cellular network that provides connectivity between user equipment 16 and the AMF or UPF 12. The gNodeB 22 is the functional equivalent of a base station in a traditional cellular network and is responsible for radio communication with UEs 16 in its coverage area, known as a cell. A gNodeB 22 may be a physical entity, such as a tower, or it may be a virtual entity, such as a software defined radio (SDR). The gNodeB 22 can assist in radio resource management, mobility management, connection management, security, quality of service, charging, or combinations thereof.

The communication interface of the network 10 operatively couples and communicates between the network traffic manager apparatus 24, various NFS, such as for example, AMF, SMF, PCF, and NRF, and further allows communication to UE 16, gNodeB 22, UPF 12 and DN 20 as shown in, for example, FIG. 1. According to some examples, some or all of the NFs may be executed as software on a single device that may be configured to allow communication between NFs. According to some examples, the communication interface 206 may be coupled to a communication network(s) that allow for communication with NFs that may be located on a separate device than the UPF 12 as well as other external devices such as UE 16, gNodeB 22 and DN 20.

By way of example only, the communication network(s) can include local area network(s) (LAN(s)) or wide area network(s) (WAN(s)), and can use TCP/IP over Ethernet and industry-standard protocols, although other types or numbers of protocols or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

Figure 2:
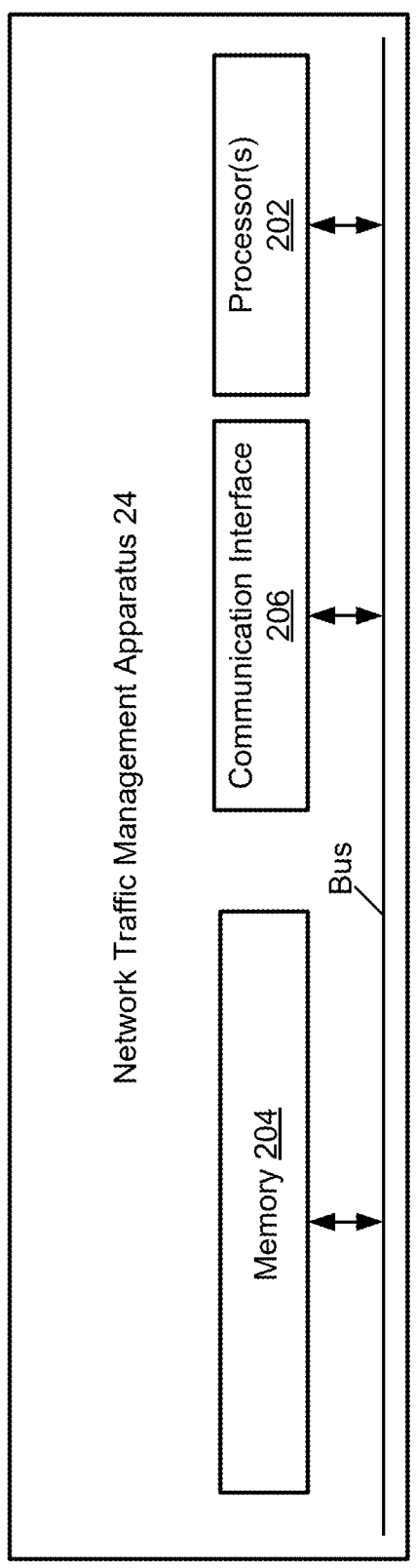
FIG. 2 is an exemplary network traffic management apparatus configured for optimizing NFProfile discovery and subscriptions.

Referring to FIGS. 1-7, a network traffic manager apparatus 24 may perform any number of functions, such as optimizing NFProfile discovery and subscription for multiple SCP instances across different network clusters as described herein. The network traffic manager apparatus 24 may perform the functions that the service communication proxy is configured to perform such as the steps described in method 800 (i.e., the steps of receiving a request, determining whether a profile of the network function is stored in common cache, retrieving the profile to respond to a message or request, etc.) (not repeated herein for brevity). The network traffic manager apparatus 24 in this example includes processor(s) 202, a memory 204, and a communication interface 206, which are coupled together by a bus, although the network traffic manager apparatus 24 can include other types or numbers of elements in other configurations as illustrated in FIGS. 1-3. Further, although the network traffic manager apparatus 24 is described herein as a device, it should be understood that in some examples, the network traffic manager apparatus 24 may be virtualized and some or all of the functionalities of network traffic manager apparatus 24 described herein may be embodied in the form of software.

The processor(s) 202 of the network traffic manager apparatus 24 may execute programmed instructions stored in the memory 204 of the network traffic manager apparatus 24 for any number of functions described and illustrated herein.

The processor(s) 202 of network traffic manager apparatus 24 may include one or more central processing units (CPUs) or general purpose processors with one or more processing cores, for example, although other types of processor(s) can also be used.

The memory 204 of the network traffic manager apparatus 24 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Accordingly, the memory of the network traffic manager apparatus 24 can store one or more modules that can include computer executable instructions that, when executed by the network traffic manager apparatus 24, cause network traffic manager apparatus 24 to perform actions, such as to transmit, receive, or otherwise process network messages, for example, and to perform other actions described and illustrated below with reference to FIGS. 1-8. The modules can be implemented as components of other modules. Further, the modules can be implemented as applications, software programs, operating system extensions, plugins, or the like.

While the network traffic manager apparatus 24 is illustrated in this example as including a single device, the network traffic manager apparatus 24 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network 10.

Additionally, one or more of the devices that together comprise the network traffic manager apparatus 24 in other examples can be standalone devices or integrated with one or more other devices or apparatuses, such as one or more server devices, for example. Moreover, one or more of the devices of the network traffic manager apparatus 24 in these examples can be in a same or a different communication network including one or more public, private, or cloud networks, for example.

Although network traffic manager apparatus 24 is illustrated as single device, one or more actions of each of the network traffic manager apparatus 24 may be distributed across one or more distinct network computing devices that together comprise one or more of the network traffic manager apparatus 24. Moreover, the network traffic manager apparatus 24 is not limited to a particular configuration. Thus, the network traffic manager apparatus 24 may contain network computing devices that operate using a master/slave approach, whereby one of the network computing devices of the network traffic manager apparatus 24 operate to manage or otherwise coordinate operations of the other network computing devices. The network traffic manager apparatus 24 may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, in some examples, one or more of the modules of the network traffic manager apparatus 24 may be an integrated software component of an a device such as an network traffic manager apparatus 24. In some examples, one or more of the modules of the network traffic manager apparatus 24 may be run as a separate container in a cloud-based deployment and may interact with the network traffic manager apparatus 24, or any other NFs.

Even further, the modules may be operative in a cloud-based computing environment. The modules can be executed within or as virtual machine(s) or virtual server(s) that may be managed in a cloud-based computing environment. Also, the modules, and even the network traffic manager apparatus 24 itself, may be located in virtual server(s) running in a cloud-based computing environment rather than being tied to one or more specific physical network computing devices. Also, the modules may be running in one or more VMs executing on the security server device. Additionally, in one or more examples of this technology, virtual machine(s) running on the network traffic manager apparatus 24 may be managed or supervised by a hypervisor.

Although the exemplary system architecture with the network traffic manager apparatus 24, SMF, NRF, SCP, and various NFs are described and illustrated herein, other types or numbers of systems, SCPs, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the system architecture 10, such as the network traffic manager apparatus 24 and various NFs, for example, may be configured to operate as virtual instances on the same physical machine. In other words, one or more of the network traffic manager apparatus 24 and various NFs may operate on the same physical device rather than as separate devices communicating through communication network(s). Additionally, there may be more or fewer network traffic manager apparatus 24 or instances of various NFs in different configurations than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples also may be embodied as one or more non-transitory computer readable media having instructions stored thereon, such as in the memory of the network traffic manager apparatus 24, for one or more aspects of the present technology, as described and illustrated by way of the examples herein. The instructions in some examples include executable code that, when executed by one or more processors, such as the processor(s) of the network traffic manager apparatus 24, may cause the processors to carry out steps necessary to implement the methods of the examples of this technology that are described and illustrated herein.

Figure 5:
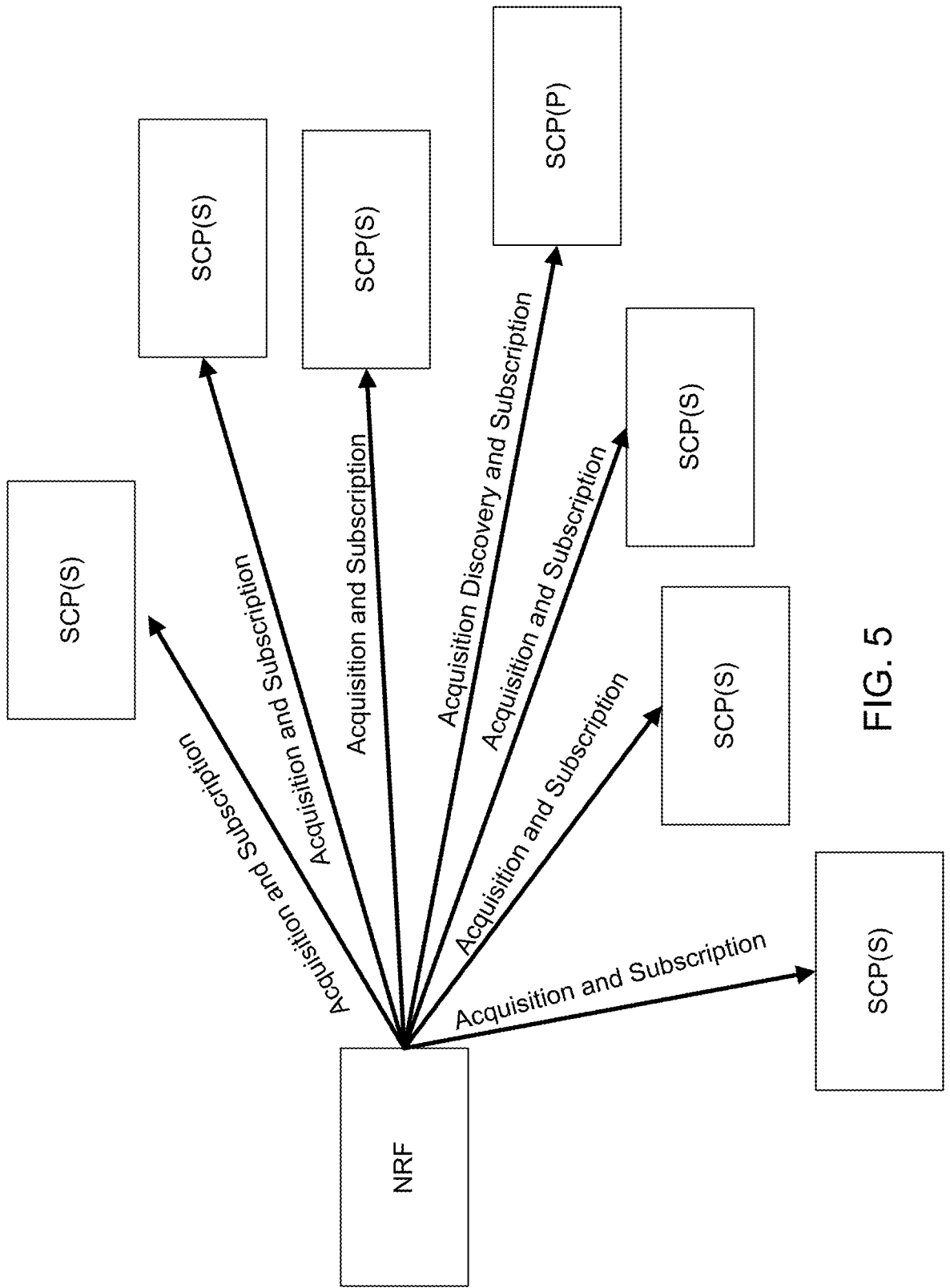
FIG. 5 is an illustration of an exemplary network cluster with a primary SCP instance and secondary SCP instances.
Figure 6:
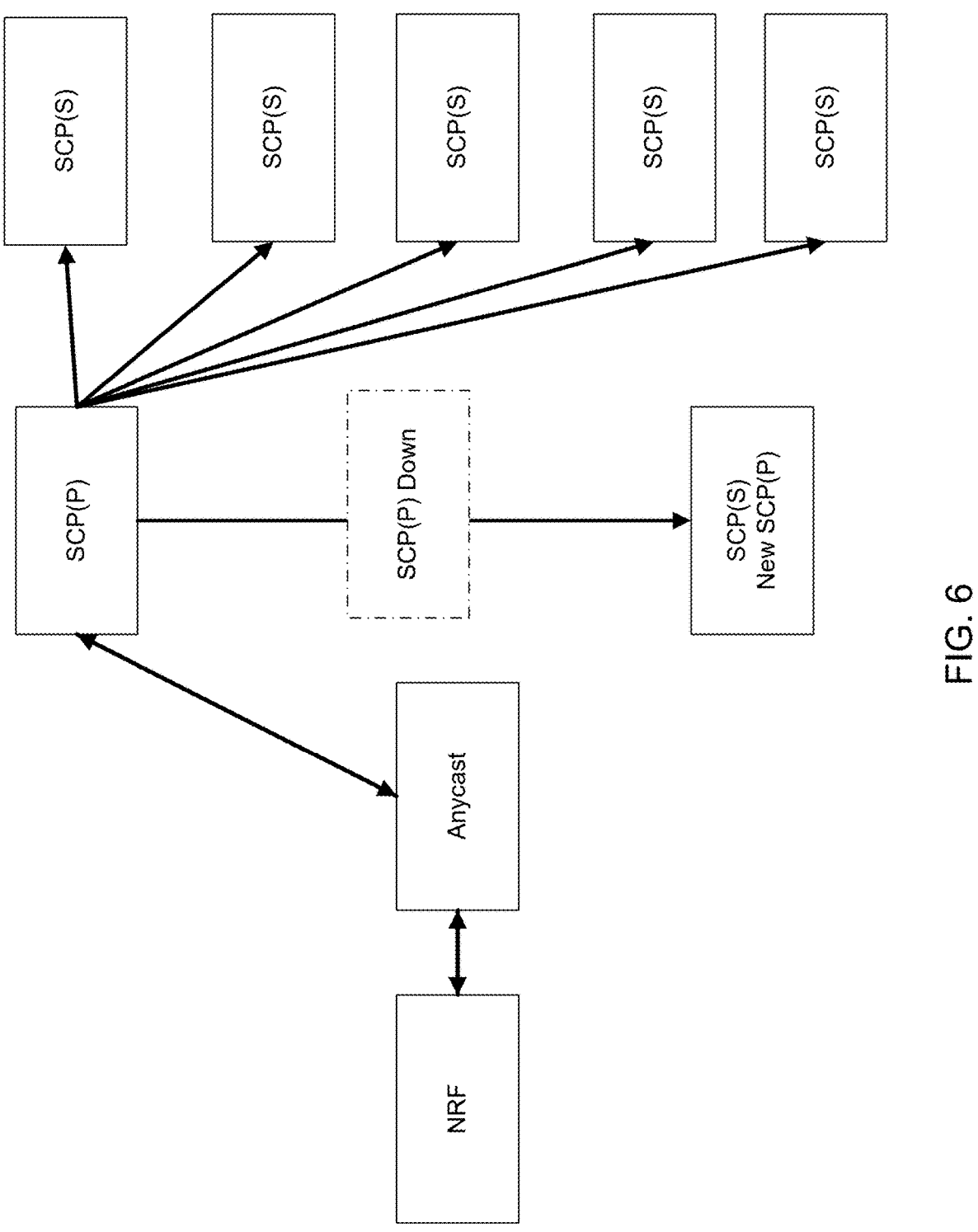
FIG. 6 is an illustration of an exemplary network cluster with a primary SCP instance going down to be a secondary SCP instance and a secondary SCP instance coming up to be the primary SCP instance.
Figure 7:
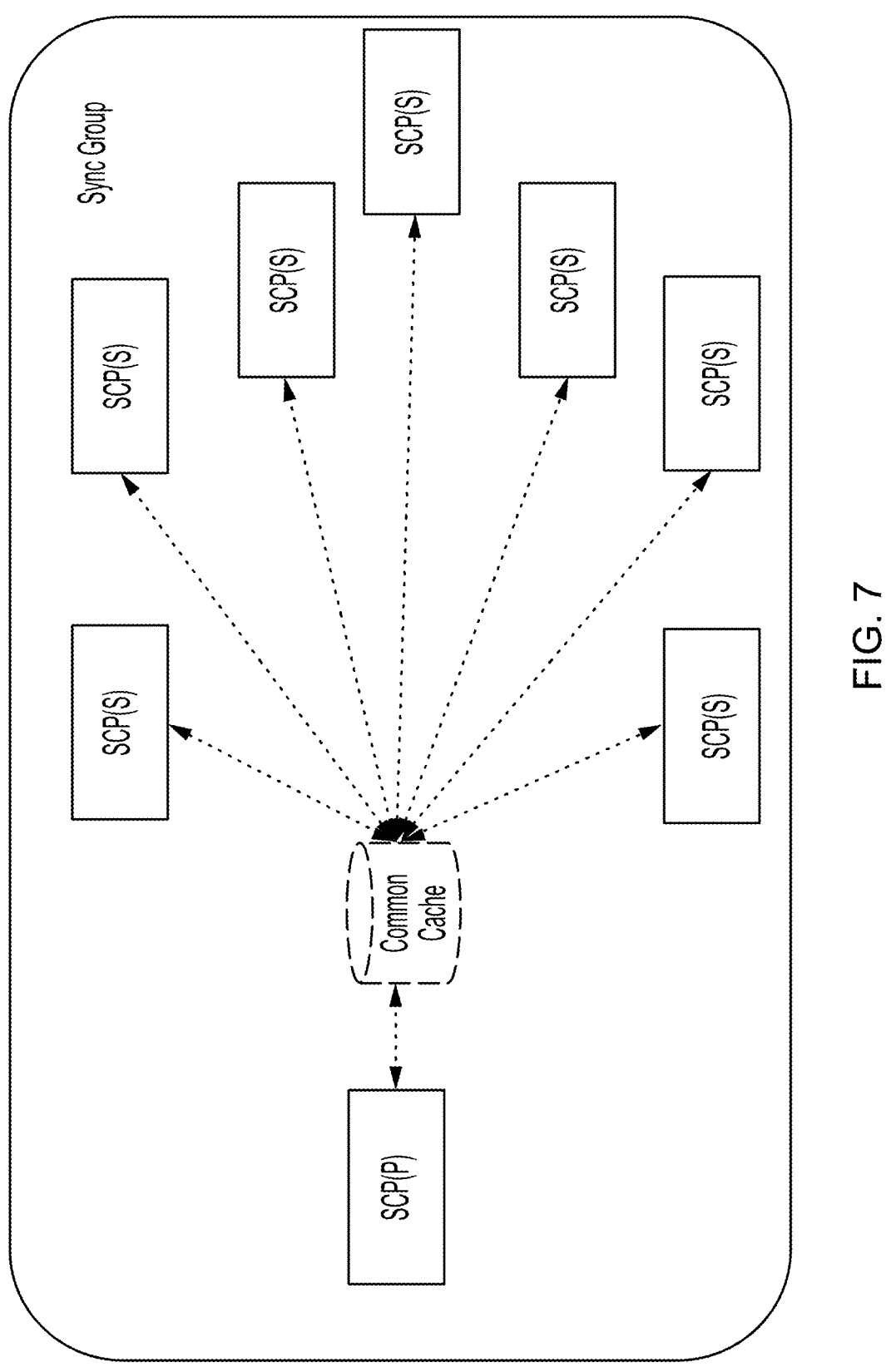
FIG. 7 is an illustration of an exemplary network cluster with a primary SCP instance and a set of secondary SCP instances as part of a sync group.
Figure 8:
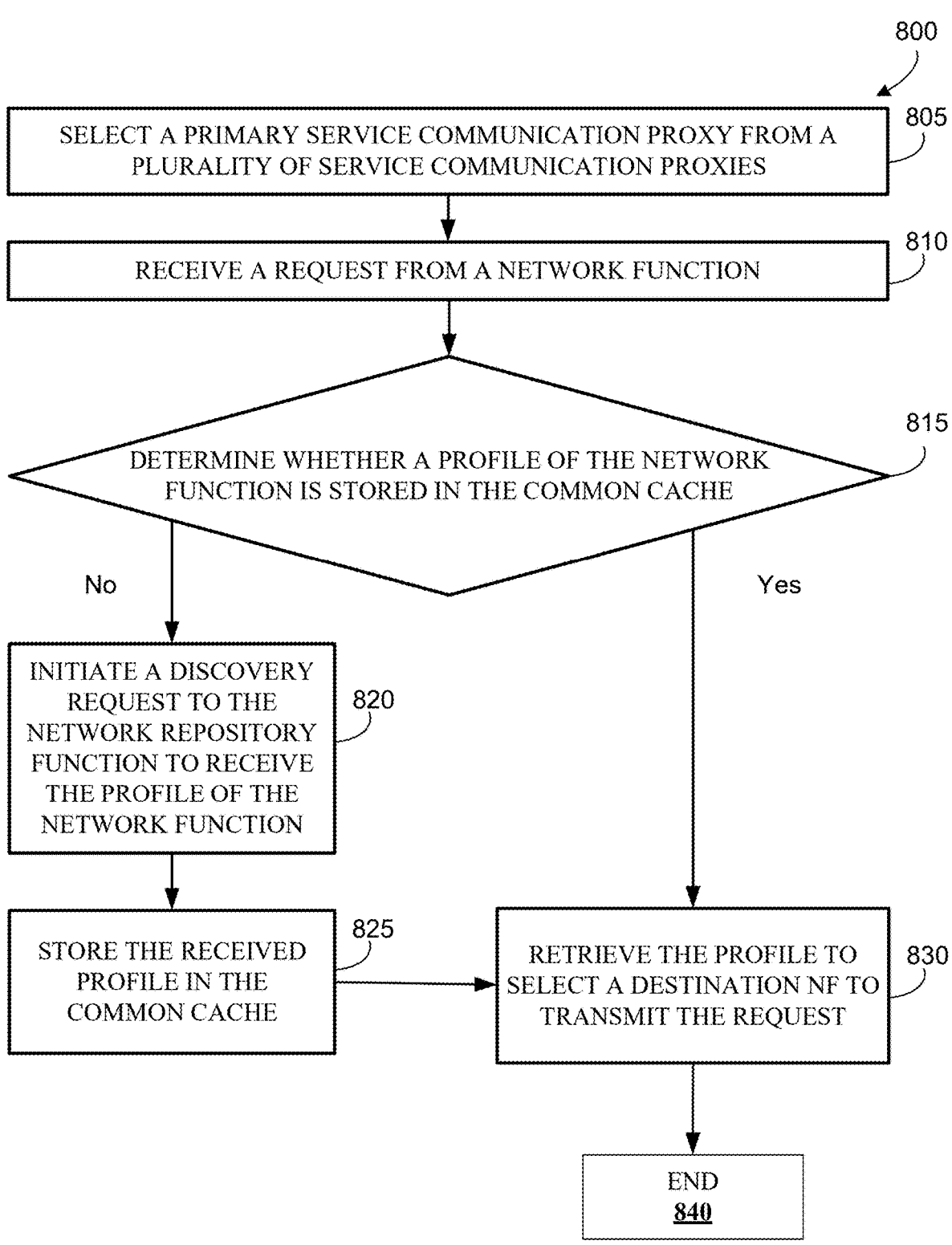
FIG. 8 is a flow diagram of an exemplary method for optimizing NFProfile discovery and subscriptions.

An exemplary method of optimizing NFProfile discovery and subscription for multiple SCP instances across different clusters will be described with reference to FIGS. 1-8. Referring more specifically to FIG. 8, a flow diagram of an example method 800 of optimizing NFProfile discovery and subscription for multiple SCP instances in core networks is illustrated. In step 805, in this example, the network traffic manager apparatus 24 may select a primary service communication proxy (SCP) from a plurality of service communication proxies (SCPs) as illustrated in FIGS. 5-7. The primary SCP can be selected using an election algorithm (such as a Bully algorithm, Paxos, RAFT, Zookeeper atomic broadcast, or any of the leader election algorithm available in a distributed environment). The remaining SCP from the plurality of SCPs can be labeled as secondary SCPs as illustrated in FIG. 7.

The plurality of SCPs will register with the NRF (and initiate discovery to the NRF if required), but once the primary SCP is selected, the primary SCP can be the only SCP among the plurality of SCPs that subscribe for update notifications from the NPF as illustrated in FIG. 5. By being the only SCP subscribing for update notifications from the NPF, the usage of the bandwidth of the mobile network can be reduced (as opposed to the usage from the plurality of SCPs subscribing to the NPF).

In some examples, if the primary SCP becomes unavailable, a new primary SCP from the plurality of SCPs can be elected using the election algorithm (such as a Bully algorithm, Paxos, RAFT, Zookeeper atomic broadcast, or any of the leader election algorithm available in a distributed environment) as illustrated in FIG. 6. Once the original primary SCP becomes available again, the network traffic manager apparatus 24 can demote the original primary SCP to secondary SCP status so that the new primary SCP is the only primary SCP subscribing for update notifications from the NPF.

Figure 4:
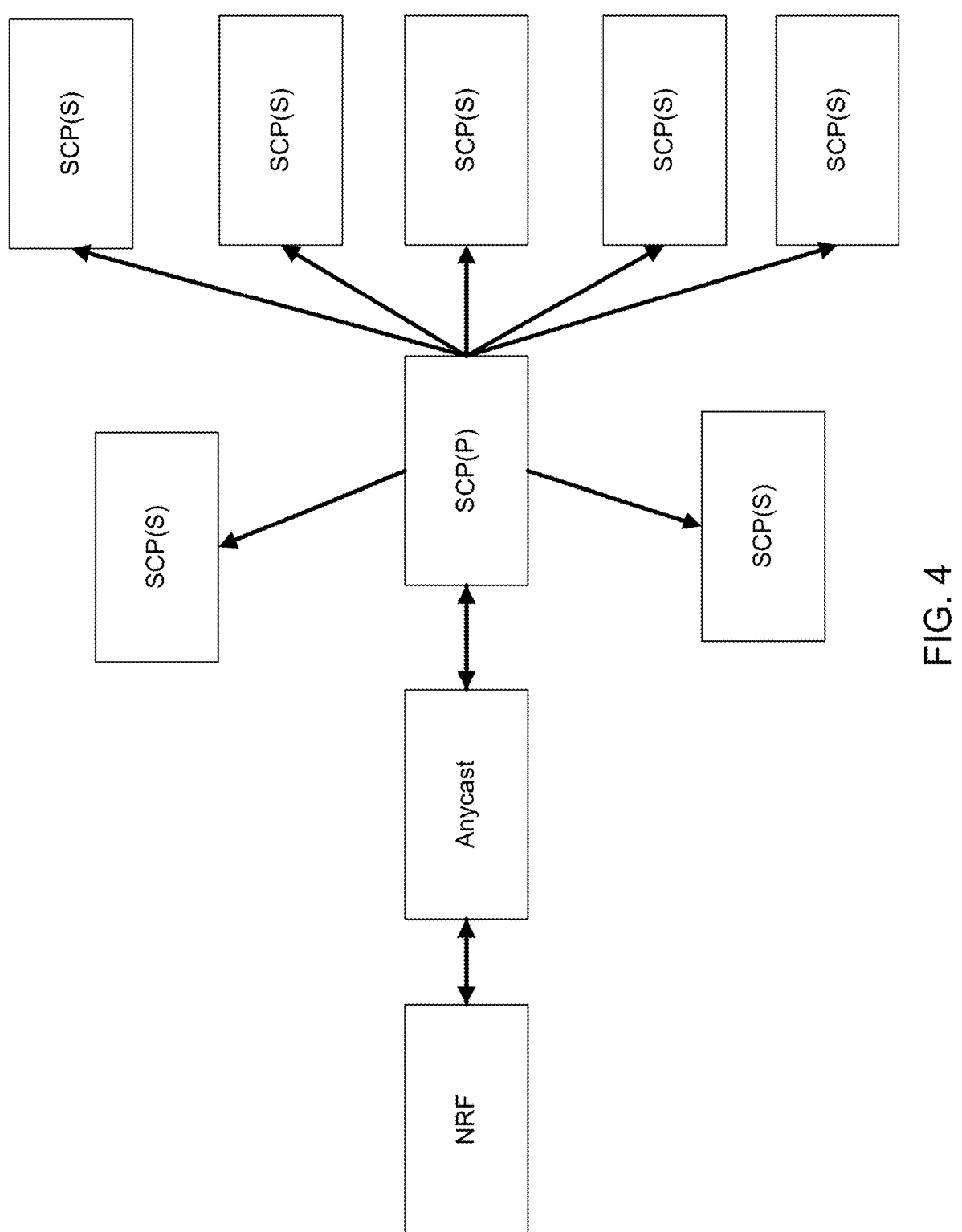
FIG. 4 is an illustration of an exemplary network cluster with a primary SCP instance with an anycast interface.

In other examples, an anycast based solution can be used to avoid single point of failure should the primary SCP become unavailable as illustrated in FIG. 4. The primary SCP can communicate with the NRF via a virtual address in case the SCP becomes unavailable. The new primary SCP through the virtual address would be able to still receive the subscription notifications that were directed for the original primary SCP. In some examples, the network traffic manager apparatus 24 can serve as the virtual address or anycast device between the NRF and the primary SCP or new primary SCP.

In step 810, the network traffic manager apparatus 24 may receive a request from a network function (NF) (or configure the primary SCP to receive the request from the NF). The request may be directed to the primary SCP or to one of the secondary SCP from the plurality of SCPs. Instead of the secondary SCP from the plurality of SCPs or the primary SCP initiating discovery with the NRF, the network traffic manager apparatus 24 or primary SCP may proceed to step 815 to first determine if the request can be fulfilled with stored data in a common cache.

In step 815, the network traffic manager apparatus 24 or primary SCP may determine whether a profile of the NF is stored in the common cache. The profile of the NF can include profile data of the NF such as a list of the properties and characteristics of the NF. The profile of the NF may also include the supported services provided by the NF. The network traffic manager apparatus 24 or the primary SCP may use an identifier of the NF to locate the profile of the NF stored in the common cache. In other examples, if the profile of the NF is stored in a data structure, the network traffic manager apparatus 24 or the primary SCP may index the data structure or search through the data structure to locate the profile of the NF.

In step 820, in response to determining that the profile of the NF is not stored in the common cache, the network traffic manager apparatus 24 may send a command to the primary SCP to initiate a discovery request to the NRF (or the primary SCP can be configured to initiate the discovery request to the NRF). Any NF profiles received by the primary SCP from the initiation of the discovery request can be transmitted to the network traffic manager apparatus 24. In other examples, if the network traffic manager apparatus 24 or primary SCP determines a profile of the NF is stored in the common cache, but that the profile of the NF is no longer relevant (has aged or is expired), then a command can also be sent to the primary SCP to initiate discovery with the NRF (or the primary SCP can be configured to initiate the discovery with the NRF when a profile of the NF is no longer relevant). The primary SCP can then transmit any responses from the discovery to the network traffic manager apparatus 24 or to the NF that initiated the request (or message). In other examples, if the request is sent to one of the secondary SCPs, the secondary SCPs may also initiate a discovery request and can store any received NF profiles in the common cache so that other SCPs do not need to initiate discovery requests for the same profile again.

In step 825, the network traffic manager apparatus 24 or primary SCP may store the received profile in the common cache. Any time the primary SCP transmits data such as the NF profile or updates to the network traffic manager apparatus 24, the network traffic manager apparatus 24 can store the data in the common cache. Any time the primary SCP receive the profile, it can also store the profile in the common cache. Additionally, any updates received by the primary SCP due to the subscription to the NRF can also be saved in the common cache by the primary SCP or network traffic manager apparatus 24. Any NF profiles or data stored in the common cache can be accessed by the secondary SCPs or the primary SCP as illustrated in FIG. 7.

In step 830, in response to determining that the profile of the network function is stored in the common cache, the network traffic manager apparatus 24 or primary SCP may select a destination NF based on based on the stored profile of the network function retrieved from the common cache and the exemplary process can end at step 840. In some examples, the primary SCP or one of the remaining secondary SCPs may handle the request by routing the request to the destination NF for the NF to complete a service based on the request. The selected destination NF can generate and transmit a response to the request after completing the service for the request.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a network traffic management system comprising one or more network traffic management devices and a plurality of network functions (NFs), the method comprising:

configuring one of a plurality of service communication proxies to:

receive a request from one of a plurality of network functions;

determine whether a profile of the one of the plurality of network functions is stored in a common cache, wherein the common cache is managed by the one of the service communication proxies and shared with others of the service communication proxies;

in response to determining the profile is in the common cache, retrieve the profile to respond to the request, wherein the profile comprises properties and characteristics of the one of the plurality of network functions; and select a destination NF based on the stored profile of the network function retrieved from the common cache.

2. The method of claim 1, further comprising:

selecting the one of the service communication proxies using an election algorithm, wherein only the one of the service communication proxies subscribes for update notifications from a network repository function.

3. The method of claim 2, wherein the one of the service communication proxies stored the profile of the one of the plurality of network functions in the common cache by initiating a discovery request to the network repository function.

4. The method of claim 2, wherein the one of the service communication proxies, in response to determining the profile of the one of the plurality of network functions is not stored in the common cache, initiates a discovery request to the network repository function to receive the profile of the one of the plurality of network functions and stores the received profile in the common cache.

5. The method of claim 2, further comprising:

selecting another one of the plurality of service communication proxies using the election algorithm when the one of the service communication proxies is unavailable.

6. A network traffic management device, comprising memory comprising programmed instructions stored thereon and one or more processors configured to be capable of executing the stored programmed instructions to:

configure one of a plurality of service communication proxies to:

receive a request from one of a plurality of network functions;

determine whether a profile of the one of the plurality of network functions is stored in a common cache, wherein the common cache is managed by the one of the service communication proxies and shared with others of the service communication proxies;

in response to determining the profile is in the common cache, retrieve the profile to respond to the request, wherein the profile comprises properties and characteristics of the one of the plurality of network functions; and select a destination NF based on the stored profile of the network function retrieved from the common cache.

7. The device of claim 6, wherein the one or more processors are further configured to be capable of executing the stored programmed instructions to:

select the one of the service communication proxies using an election algorithm, wherein only the one of the service communication proxies subscribes for update notifications from a network repository function.

8. The device of claim 7, wherein the one of the service communication proxies stored the profile of the one of the plurality of network functions in the common cache by initiating a discovery request to the network repository function.

9. The device of claim 7, wherein the one of the service communication proxies, in response to determining the profile of the one of the plurality of network functions is not stored in the common cache, initiates a discovery request to the network repository function to receive the profile of the one of the plurality of network functions and stores the received profile in the common cache.

10. The device of claim 7, wherein the one or more processors are further configured to be capable of executing the stored programmed instructions to:

select another one of the plurality of service communication proxies using the election algorithm when the one of the service communication proxies is unavailable.

11. A network traffic management system, comprising one or more network traffic management devices and network functions (NFs) with memory comprising programmed instructions stored thereon and one or more processors configured to be capable of executing the stored programmed instructions to:

configure one of a plurality of service communication proxies to:

receive a request from one of a plurality of network functions;

determine whether a profile of the one of the plurality of network functions is stored in a common cache, wherein the common cache is managed by the one of the service communication proxies and shared with others of the service communication proxies;

in response to determining the profile is in the common cache, retrieve the profile to respond to the request, wherein the profile comprises properties and characteristics of the one of the plurality of network functions; and select a destination NF based on the stored profile of the network function retrieved from the common cache.

12. The system of claim 11, wherein the one or more processors are further configured to be capable of executing the stored programmed instructions to:

select the one of the service communication proxies using an election algorithm, wherein only the one of the service communication proxies subscribes for update notifications from a network repository function.

13. The system of claim 12, wherein the one of the service communication proxies stored the profile of the one of the plurality of network functions in the common cache by initiating a discovery request to the network repository function.

14. The system of claim 12, wherein the one of the service communication proxies, in response to determining the profile of the one of the plurality of network functions is not stored in the common cache, initiates a discovery request to the network repository function to receive the profile of the one of the plurality of network functions and stores the received profile in the common cache.

15. The system of claim 12, wherein the one or more processors are further configured to be capable of executing the stored programmed instructions to:

select another one of the plurality of service communication proxies using the election algorithm when the one of the service communication proxies is unavailable.

16. A non-transitory computer readable medium having stored thereon instructions comprising executable code that, when executed by one or more processors, causes the one or more processors to:

configure one of a plurality of service communication proxies to:

receive a request from one of a plurality of network functions;

determine whether a profile of the one of the plurality of network functions is stored in a common cache, wherein the common cache is managed by the one of the service communication proxies and shared with others of the service communication proxies;

in response to determining the profile is in the common cache, retrieve the profile to respond to the request, wherein the profile comprises properties and characteristics of the one of the plurality of network functions; and select a destination NF based on the stored profile of the network function retrieved from the common cache.

17. The non-transitory computer readable medium of claim 16, comprising further instructions that, when executed by the one or more processors, causes the one or more processors to:

select the one of the service communication proxies using an election algorithm, wherein only the one of the service communication proxies subscribes for update notifications from a network repository function.

18. The non-transitory computer readable medium of claim 17, wherein the one of the service communication proxies stored the profile of the one of the plurality of network functions in the common cache by initiating a discovery request to the network repository function.

19. The non-transitory computer readable medium of claim 17, wherein the one of the service communication proxies, in response to determining the profile of the one of the plurality of network functions is not stored in the common cache, initiates a discovery request to the network repository function to receive the profile of the one of the plurality of network functions and stores the received profile in the common cache.

20. The non-transitory computer readable medium of claim 17, comprising further instructions that, when executed by the one or more processors, causes the one or more processors to:

select another one of the plurality of service communication proxies using the election algorithm when the one of the service communication proxies is unavailable.

* * * * *